March 22, 1966
F. FLISCH
3,241,235
SHEARS FOR CUTTING REINFORCING ELEMENTS
CONSISTING OF A PAIR OF PARALLEL WIRES
Filed Nov. 13, 1963
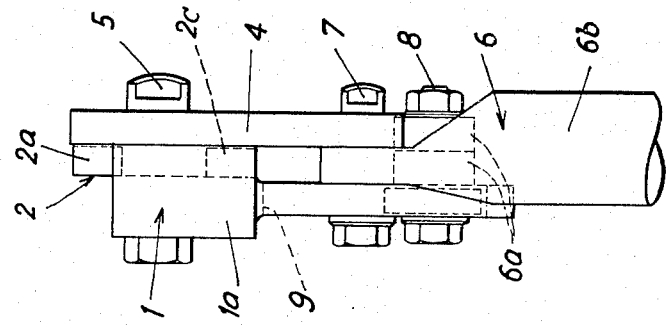
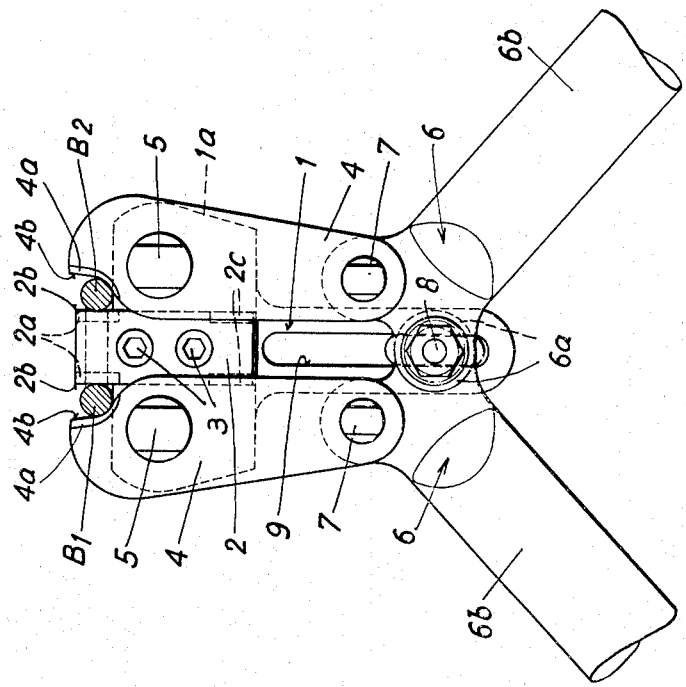
INVENTOR:
FÉLIX FLISCH
ATTORNEYS United States Patent Office 3,241,235
Patented Mar. 22, 1966

3,241,235
SHEARS FOR CUTTING REINFORCING ELEMENTS CONSISTING OF A PAIR OF PARALLEL WIRES
Félix Flisch, Rue des Melezes, Les Geneveys-sur-Coffrane, Switzerland
Filed Nov. 13, 1963, Ser. No. 323,468
Claims priority, application Austria, Nov. 22, 1962,
A 9,191/62
3 Claims. (Cl. 30—211)

The present invention relates to shears and more especially to shears adapted for cutting reinforcing elements consisting of a pair of parallel wires and of studs interconnecting them at intervals of their length. Such reinforcing elements are obtainable on the market under the registered trade name "Bi-Stahl" and find an increasing demand which is due to their outstanding advantages. The building contractors and other people using such elements however ask urgently for shears, hitherto not yet available, by means of which both wires of such reinforcing elements may be cut in a single stroke.

Accordingly, the main object of the present invention is to fill such lack. The invention provides shears comprising a carrier element centrally located with respect to a longitudinal middle plane of the shears and having a fore portion and a rear portion, a cutting insert secured to the carried element and having an end portion which protrudes from said fore portion and which has lateral cutting edges symmetrically arranged with respect to said longitudinal middle plane, two movable cutting elements rockably mounted on said carrier element and having each a cutting edge arranged for cooperation with one of the cutting edges of said insert, and two actuating members also rockably mounted on said carrier element and arranged for actuating the movable cutting elements to move the cutting edges thereof towards the associated cutting edges of the insert and to keep these movable cutting elements always symmetrical to each other with respect to said longitudinal middle plane.

The accompanying drawings represent, by way of example, a preferred embodiment of the shears according to the invention. In these drawings:

FIG. 1 is an elevational view, the long arms of the actuating levers being partly broken away, and FIG. 2 is a side view corresponding to FIG. 1.

The shears represented on the drawings comprise in their head portion a T-shaped carrier element 1 (FIG. 1) the transversely extending fore portion 1a of which is thickened and has in the middle of its front face a groove. A cutting insert 2 is introduced with practically no lateral play into this groove and secured to the element 1 by means of two screws 3, whereby it may be removed, reversed for a purpose described later on and, if necessary, replaced with a similar insert. The front face of this cutting insert has been ground and is exactly flush with the ground front faces located on both sides of the groove; the lateral faces 2a of the portion of cutting insert which protrudes from the carrier element 1 are also ground and antersect to front face of the cutting insert at an acute angle (the angle is 80°, for example); the cutting edges 2b thereby provided are symmetrically located with respect to the longitudinal middle plane of the shears and parallel thereto.

The lateral arms of the fore portion of the carrier element 1 have each a bore; in these bores which are also symmetrically located with respect to the just mentioned plane, are held swivel pins 5 rotatably supporting movable cutting elements 4 each of which is a two-armed lever. The short upper arm of each such element 4 has a ground inwardly turned surface 4a intersecting a ground rear face to provide a cutting edge 4b; since the just mentioned rear faces glide on the front face of the carrier element and of the cutting insert 2, the cutting edges 4b are in shearing relation with the adjacent cutting edges 2a. The two wires of a reinforcing element to be cut with the shears are indicated at B1 and B2; the distance between the cutting edges 2b should be substantially equal to, or slightly smaller than, the standardized inner width between the wires B1, B2.

Two actuating members 6 symmetrically arranged with respect to the above mentioned longitudinal middle plane are articulated to the ends of the longer arms of the movable cutting elements 4 by means of swivel pins 7. These members have an integral lug 6a; the two lugs are superposed and articulated to each other by means of a bolt 8 which passes through a rectilinear, centrally arranged slot 9 provided in the rear portion of the carrier element 1 and is movable in the longitudinal direction of this slot. It is thus clear that on actuation of the shears the parts 4 and 6 are always kept symmetrical to the above-mentioned longitudinal middle plane; it can moreover be seen from FIG. 2 that the axes of the long cylindrical actuating arms 6b belonging to the actuating members 6 are located on, and move along the plane of contact of the movable cutting elements 4 with the front face of the cutting insert 2, that is the shearing plane. It can also be seen from FIG. 1 that each movable cutting element 4 taken with the associated actuating member 6 acts in the manner of a double-lever mechanism, whereby a great shearing force can be exerted without undue strength. The two mechanisms are connected with each other and with the carrier element 1 and cutting insert 2 so that the latter does not move during actuation of the shears; it is therefore quite easy to cut the two wires B1, B2 of the reinforcing element simultaneously in a single stroke.

In the example represented in the drawings each of the pins or bolts 5, 6 and 8 has a head at one of its ends and a threaded portion at its other end, the threaded portion carrying a nut, as shown.

The details of the actuating mechanisms are not vital, since they may be taken over from well known wire cutting shears having merely one stationary cutting edge and one movable cutting edge. In other terms, the actuating mechanisms might be a construction different from that shown; for example, the actuating members might be rockably mounted on a single swivel pin, or two swivel pins, fast on the lower or rear end portion of the carrier element, and have in the vicinity of such pin or pins a spiral-shaped cam surface adapted to act on the longer lever arm of the movable cutting elements 4 for moving the movable cutting edges 4b toward the fixed cutting edges 2a of the insert 2; the movement of the elements 4 in the opposite direction (for restoring the starting position) may then be performed by suitably arranged springs.

The insert 2 has at its rear end a pair of cutting edges 2c, which may be put in the position of use (that is, in the position of the edges 2b) by securing the insert 2 to the carrier element 1 in a reversed position as soon as the edges 2b are worn.

I claim:
1. Shears for cutting reenforcing elements consisting of a pair of parallel wires comprising a carrier element centrally located with respect to a longitudinal middle plane of the shears and having a fore portion having a front face with a groove in the middle of said front face, a cutting insert secured to the carrier element in said front groove and having an end portion which protrudes from said fore portion and which has two lateral spaced cutting edges symmetrically arranged on each side of said longitudinal middle plane, two movable cutting elements positioned in substantially the same plane and rockably mounted on said carrier element, each having a cutting edge to cooperate with one of the cutting edges of said insert, and two actuating members also rockably mounted on said carrier element to actuate the movable cutting elements thereby moving the cutting edges thereof toward the cutting edges of the insert.

2. Shears according to claim 1, insert has substantially no lateral play and in which screws are provided by means of which said insert is removably secured to said carrier element.

3. Shears according to claim 2 in which the screws provided for securing the cutting insert to said carrier element are disposed substantially along the longitudinal middle plane.

References Cited by the Examiner
UNITED STATES PATENTS

| | | | |
|---|---|---|---|
| 446,360 | 2/1891 | Munson | 30—193 |
| 1,356,882 | 10/1920 | Pendleton | 30—252 |
| 2,546,435 | 3/1951 | Fine | 30—197 X |
| 2,548,077 | 4/1951 | Tamol | 30—211 |

WILLIAM FELDMAN, *Primary Examiner.*